Dec. 19, 1933.                 H. A. BRASSERT                 1,939,874
                       METHOD FOR THE PRODUCTION OF STEEL
                              Filed June 22, 1931
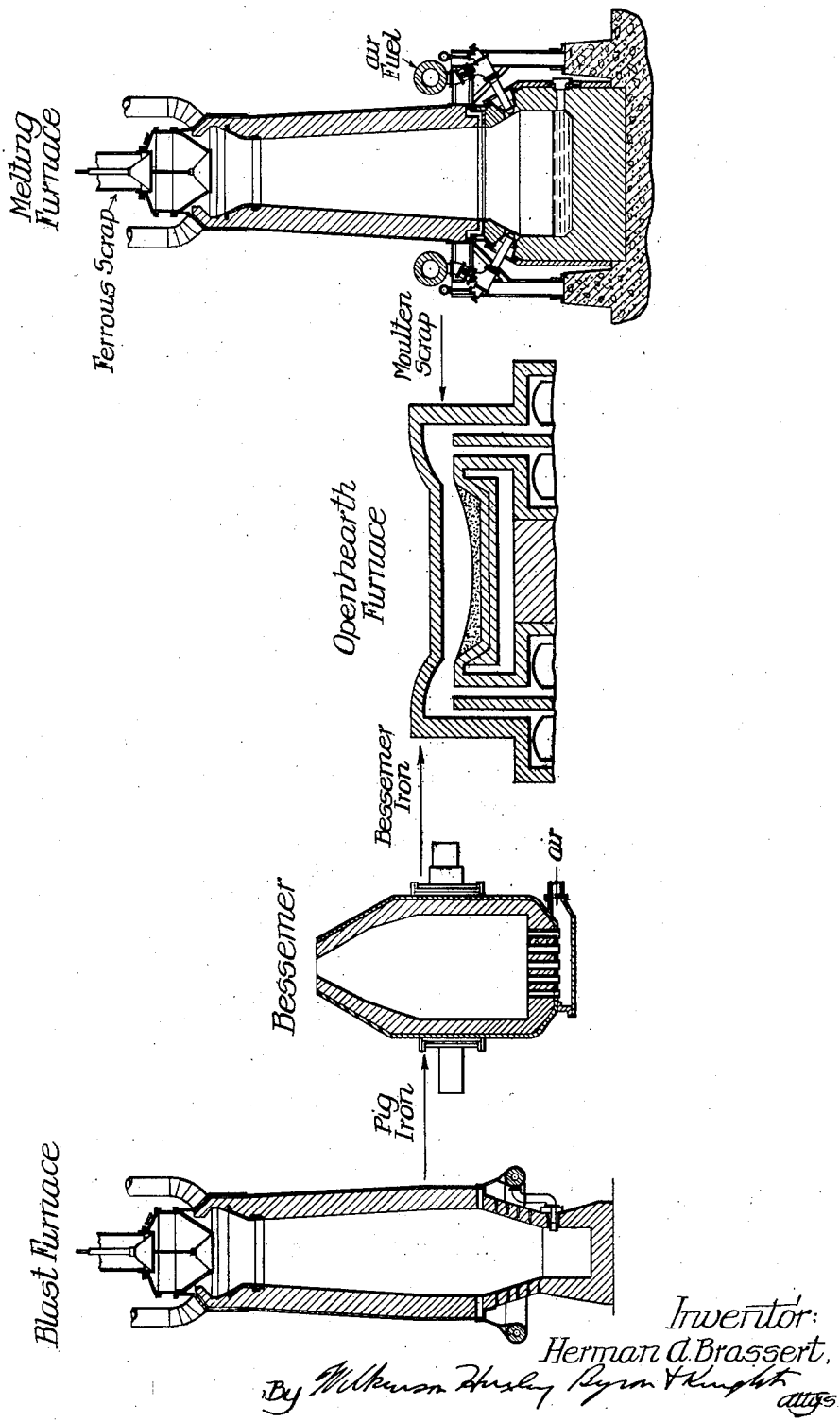
Inventor:
Herman A. Brassert,
By Wilkinson Huxley Byron & Knight
                                          Attys Patented Dec. 19, 1933

1,939,874

UNITED STATES PATENT OFFICE 1,939,874

METHOD FOR THE PRODUCTION OF STEEL

Herman A. Brassert, Chicago, Ill., assignor to H. A. Brassert & Company, Chicago, Ill., a corporation of Illinois Application June 22, 1931. Serial No. 546,167

6 Claims. (Cl. 75—27)

This invention relates to a new and improved method for the production of steel, and more particularly to a method for the production of steel from molten iron without the admixture of any substantial portion of steel scrap.

The method at present used for the production of the major portion of the world's steel requirements comprises the use of both molten pig iron made from ores and cold steel scrap in a single process, namely the open hearth process. The iron ore is smelted in a blast furnace to produce molten iron and the molten iron is refined in an open hearth furnace where a large amount of cold steel scrap is added.

A smaller portion of steel is produced by the acid or basic Bessemer process, but this steel is not regarded as equivalent in quality to open hearth steel and its relative proportion in the world's steel production has been gradually diminishing. Some steel is produced by a duplex process whereby the molten pig iron is first treated in the Bessemer converter and then refined in the open hearth furnace. Due to the use of cold scrap in an uneconomical melting furnace, having high radiation losses and inefficient heat transfer, the open hearth process requires a considerable period of time and large expenditures of fuel for the production of steel.

A small quantity of steel is made in electric furnaces but this process by itself is expensive and its use is confined largely to the production of special and alloy steels.

The economical manufacture of steel requires the remelting and use of steel scrap and in my copending application Serial No. 544,492, filed June 15, 1931, I have described a method and apparatus for making steel from scrap alone by the use of a vertical shaft furnace. The method and apparatus of my application referred to, may be used in the same plant with the method of the present application, thus avoiding the present wasteful method of charging cold scrap into an open hearth furnace. This results in the most efficient use of the molten iron from blast furnaces and the separate use of scrap through a vertical shaft furnace where each may receive the most efficient treatment, rather than combining them and treating them together in an open hearth furnace as is now the general practice.

It is an object of the present invention to provide a new and improved method for the conversion of iron ore and steel scrap into finished steel.

It is a further object to provide a method of this character in which the ore and scrap phases of the conversion process are carried out in apparatus most suited for the particular phase.

It is an additional object to provide a method adapted to be carried out in usual types of apparatus.

Other and further objects will appear as the description proceeds.

The single figure of the attached drawing shows a diagrammatic layout of apparatus for carrying out my improved method, the direction of movement of material being indicated by arrows and legends.

The method of the present application relates to the production of steel from iron ore without any material addition of scrap steel. It also eliminates the open hearth process as usually practiced, this method being the least efficient of all of the melting and refining methods.

I propose to use a blast furnace for the reduction and melting of the iron ores. The blast furnace is the most efficient apparatus for this purpose, as it utilizes the counter-current principle of heat exchange, reduces the iron ores very largely by the waste gases resulting from the melting process, and recovers the remaining values contained in the gases after the reduction of the ores, by their utilization for heating the blast, for generating power and for melting and heating the steel.

The molten iron from the blast furnace is treated in a Bessemer converter for removal of the impurities contained in the molten iron, because it is the most efficient apparatus for accomplishing this result. The Bessemer converter removes the silicon, carbon and, if necessary, the phosphorus, in ten to thirty minutes without use of external heat, whereas the open hearth furnace requires many times as long for accomplishing the same task with the consumption of a great deal of external heat, amounting to from four to six million B. t. u.'s per ton of steel. A basic lined converter is required for use with metal derived from ores high in phosphorus. The phosphorus in this case furnishes part of the required fuel. If the iron treated in the Bessemer is too low in phosphorus, I propose to use hot blast.

Having thus described the treatment of the portion of the source of metal from the iron ore, we now come to the fuel phase of steel production, namely from steel scrap. The steel scrap which forms approximately 50% of the present normal open hearth charge I propose not to melt in the open hearth furnace but in a specially designed shaft furnace, as disclosed in my copending application above referred to, and shown at the right of the drawing in the present case. The ferrous scrap is charged into the top of the furnace through the usual types of charging bells shown. The shaft of the furnace is somewhat cone-shaped to permit the free descent of the charge. The lower or hearth portion is somewhat dome shaped with the lower portions of its walls substantially vertical. Water cooled tuyères extend through the dome walls, these tuyères serving for the introduction of both fuel and air, these tuyères being so located as to be out of contact with the molten metal. The hearth is equipped with one or more tapping holes through which metal and slag may be drawn off as desired. The use of fuel injected at the tuyères prevents the absorption of carbon by the ferrous scrap, which invariably takes place in present methods of melting steel scrap in a cupola or blast furnace where coke is charged together with the scrap. This shaft furnace can produce steel of approximately the same composition as that resulting from the Bessemer blower of the ore phase. From this point all the molten product from both the ore and the scrap phase can be treated together in the same refining furnace, whether it be a stationary, tilting, externally fired furnace of the open hearth type, or an electrical furnace, but such refining will not involve the melting of substantial amounts of scrap and only such additions are provided here as will further improve the quality of the steel. There may be localities or conditions which render a supply of steel scrap unusually scarce, in which case there may not be enough to warrant the installation or use of a special vertical shaft furnace for this purpose. In that case such limited quantities of iron or steel scrap, borings and turnings or off-grade pig iron may be remelted in the blast furnace by adding them to the ore burden. But if larger quantities of such materials are to be remelted than can be economically melted in the blast furnace, then a vertical, externally fired shaft furnace should be used for this purpose and its melt added to the blown metal from the Bessemer process of the ore phase.

In case that relatively large amounts of iron scrap and small amounts of steel scrap are available which may result in a higher carbon content of the metal, this molten metal may be added to the blast furnace metal for removal of carbon in the Bessemer converter or it may even in some cases be found economical to add some carbon to the vertical shaft, steel scrap melting furnace, as for instance coke dust or braize or other cheap carbonaceous material for the purpose of putting carbon into this melt and adding it to the pig iron, thereby regulating the carbon content of the Bessemer charge and regaining its fuel value by combustion in the Bessemer converter. Or such carbonaceous matter may be added in the vertical shaft furnace for the purpose or with the intention of removing the carbon in the hearth of said furnace by carrying an oxidizing flame through adding an excess of air to the injected fuel. In this manner the heat value of such carbon is utilized in the hearth of the shaft furnace and its presence has the advantage under certain conditions of controlling a pasty condition of the melting mass. In case the removal of phosphorus or sulphur is desired, lime or other suitable fluxes are added and the character of the flame may be controlled to be oxidizing or reducing, to suit the removal of these respective elements. Whatever variations in these respects may prove the most economical, I will in no case charge a substantial amount of cold steel scrap into an open hearth furnace.

While I have described certain methods of carrying out my invention, these are to be understood as illustrative only, as I contemplate such changes and modifications as come within the spirit and scope of the appended claims.

I claim:

1. The method of steel production, which comprises reducing and melting ore in a shaft furnace by charging carbon into said furnace with the ore, causing combustion in the lower portion of the furnace, passing the gaseous products of combustion upwardly through the charge, removing impurities by blowing a blast of air through the metal, melting ferrous scrap in a separate shaft furnace, controlling the carbon content of the molten ferrous scrap in relation to the carbon in the blown metal and to the desired carbon content of the final melt, mixing the two molten metals, and refining the molten mixed metal.

2. The method of steel production, which comprises reducing and melting ore in a shaft furnace by charging carbon into said furnace with the ore, causing combustion in the lower portion of the furnace, passing the gaseous products of combustion upwardly through the charge, removing impurities by blowing a blast of air through the metal, melting steel scrap in a separate shaft furnace by means of the heated products of combustion in the shaft furnace of fuel and air injected into said furnace, mixing the two metals, and refining the mixed metal under open hearth conditions.

3. The method of steel production, which comprises reducing and melting ore in a shaft furnace by charging carbon into said furnace with the ore, causing combustion in the lower portion of the furnace, passing gaseous products of combustion upwardly through the charge, removing impurities by blowing a blast of air through the metal while contained in a vessel having a basic lining, melting iron and steel scrap in a separate shaft furnace by passing the gaseous products of combustion upwardly through the charge, said heated products of combustion being formed in the separate shaft furnace by combustion of fuel and air injected into the furnace, and refining the metal under open hearth conditions.

4. The method of steel production, which comprises reducing and melting iron ore in a shaft furnace, removing impurities by blowing a blast of air through the metal, melting ferrous scrap in a separate shaft furnace, carburizing the same by the use of carbon in excess of that required for producing the heat for melting said scrap, removing excess carbon by an oxidizing flame resulting from fuel and excess air injected into said separate shaft furnace, and mixing and refining the metals under open hearth conditions.

5. The method of steel production, which comprises melting ferrous scrap in a vertical shaft furnace with the addition of carbon, carburizing the scrap by carbon in excess of the amount necessary for producing sufficient heat for melting the scrap, removing excess carbon and other impurities by an oxidizing flame resulting from fuel and excess air injected into the hearth of said furnace.

6. The method of steel production, which comprises melting ferrous scrap in a vertical shaft furnace with the addition of carbon and fluxes, carburizing the scrap by carbon in an excess of the amount necessary for producing sufficient heat for melting the scrap, removing excess carbon and other impurities in the same furnace by a flame controllable as to its oxidizing effect.

HERMAN A. BRASSERT.